(12) United States Patent
Hock

(10) Patent No.: US 12,263,916 B1
(45) Date of Patent: Apr. 1, 2025

(54) FAST ATTACHING LINE MANAGEMENT APPARATUS FOR MARINE VESSELS AND THE LIKE

(71) Applicant: John Hock, Stuart, FL (US)

(72) Inventor: John Hock, Stuart, FL (US)

( * ) Notice: Subject to any disclaimer, the term of this patent is extended or adjusted under 35 U.S.C. 154(b) by 499 days.

(21) Appl. No.: 17/700,102

(22) Filed: Mar. 21, 2022

(51) Int. Cl.
*B63B 21/20* (2006.01)
*B63B 21/04* (2006.01)
*F16G 11/10* (2006.01)

(52) U.S. Cl.
CPC ............ *B63B 21/20* (2013.01); *B63B 21/04* (2013.01); *F16G 11/10* (2013.01)

(58) Field of Classification Search
CPC ......... B63B 21/20; B63B 21/04; F16G 11/10; F16G 11/04; F16G 11/12; F16G 11/14
See application file for complete search history.

(56) References Cited

U.S. PATENT DOCUMENTS 3,766,610 A * 10/1973 Thorsbakken .......... F16G 11/14
                                                              403/230

\* cited by examiner

*Primary Examiner* — Anthony D Wiest
(74) *Attorney, Agent, or Firm* — Gulf Coast Intellectual Property Group

(57) ABSTRACT

A line management apparatus that is configured to provide a technique to secure an anchor line of a marine vessel to the bow thereof in combination when deployed with a bridle. The present invention includes a bottom support member that is planar in manner having a first vertical support member and a second vertical support member extending upwards therefrom and being perpendicular thereto. The line management apparatus includes a first locking member that is pivotally secured to the first vertical support member and wherein a first aperture is generally underneath a portion thereof. A second locking member is pivotally secured to the second vertical support member and is positioned above a second aperture formed in the bottom support member. The line management apparatus is configured to have a portion of a line journaled through the first aperture and second aperture so as to provide load transfer of the line.

14 Claims, 3 Drawing Sheets

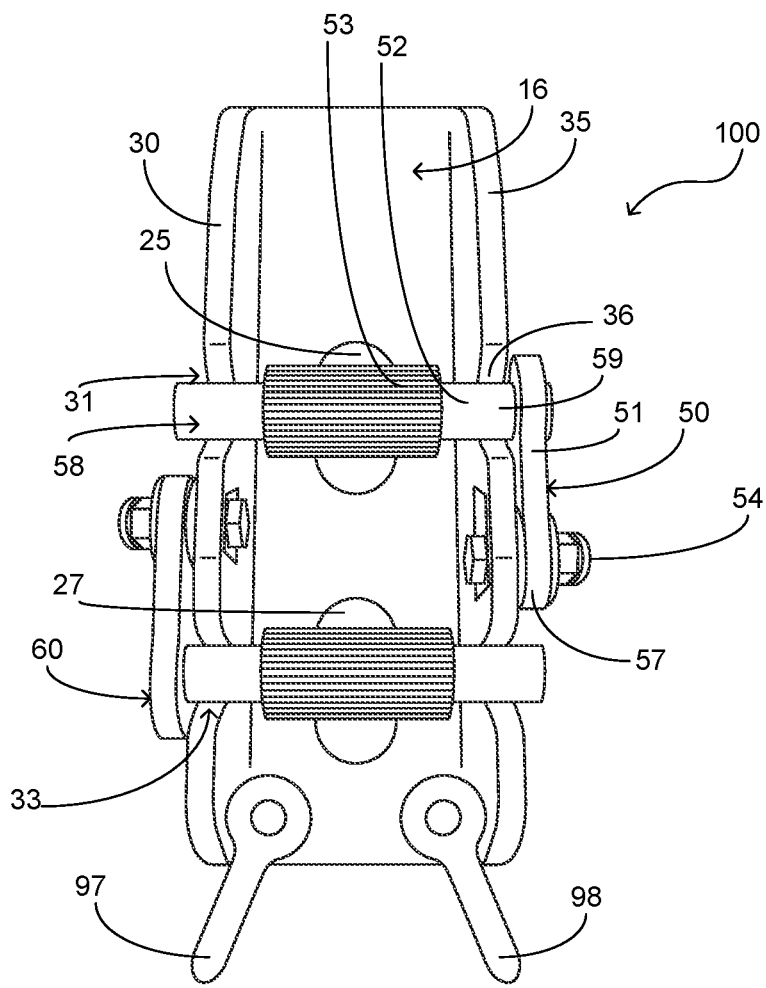
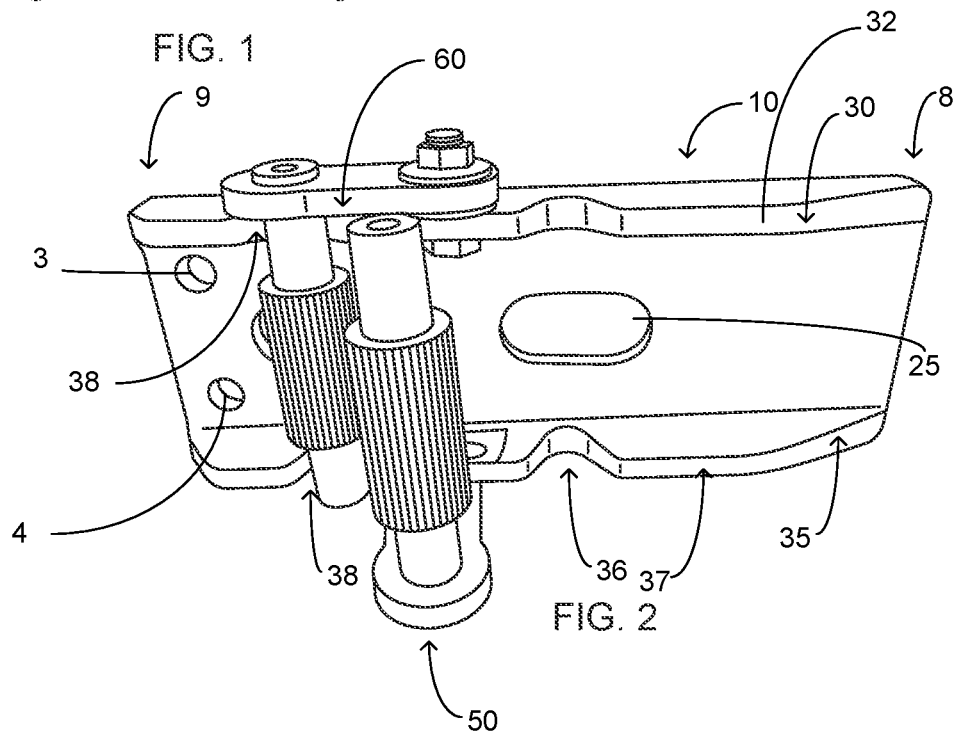

FAST ATTACHING LINE MANAGEMENT APPARATUS FOR MARINE VESSELS AND THE LIKE

FIELD OF THE INVENTION

The present invention relates generally to fast attaching line handling devices for marine vessels, more specifically but not by way of limitation, a line management apparatus that is configured to provide efficient operable coupling of bridle lines to an anchor line for use in applications such as but not limited to anchoring a multi-hull vessel or other types of marine vessels.

BACKGROUND

As is known in the art, marine vessels of all types use various lines to perform activities such as but not limited to docking, mooring and operation of components such as but not limited to sails. While sailboats have specialized equipment and lines providing operation thereof, other lines and equipment are ubiquitous to both sail and power vessels. Commonly utilized lines are dock lines which operably couple cleats of the vessel to a dock or pier. Another common line deployed is an anchor rode and many vessels utilize a bridle in combination with the anchor rode. Both mono-hull vessels and multi-hull vessels can employ utilization of a bridle wherein the bridle is secured to cleat on both the port and starboard sides of the vessel at the bow and the anchor line is operably coupled to the bridle.

One issue with anchoring multi-hull vessels without the use of a bridle is the amount of anchor sway that can occur. If only one hull of a catamaran is utilized to secure the anchor rode the vessel will sway excessively on the rode. While this may be acceptable in some locations, many anchorages can have other vessels present and it is preferred to employ a technique that will minimize sway in order to avoid contact with other vessels and provide maximum space for as many vessels as possible. Additionally, for sailing catamarans it is desirable to reduce excess weight and as such many operators of these vessels deploy a shorter length of chain and the rest of the rode is rope. While there are existing devices for attaching a bridle to an anchor chain, there is no existing device that facilitates coupling of bridle lines to an anchor line.

It is intended within the scope of the present invention to provide a line management apparatus that is configured to provide operable coupling of an anchor line with ends of bridle lines in order to provide an optimum, fast attaching arrangement for anchoring a catamaran vessel or other types of marine vessels.

SUMMARY OF THE INVENTION

It is the object of the present invention to provide a marine vessel fast acting line management apparatus that is configured to operable couple bridle lines to an anchor line wherein the present invention includes a body manufactured from a durable material such as but not limited to aluminum or stainless steel.

Another object of the present invention is to provide a line management apparatus to be employed on a marine vessel wherein the body includes a bottom support member having a first end and a second end.

A further object of the present invention is to provide a marine vessel line management apparatus that is configured to operable couple bridle lines to an anchor line wherein the bottom support member includes opposing lateral edges and wherein the opposing lateral edges include vertical support members extending upwards therefrom.

Still another object of the present invention is to provide a line management apparatus to be employed on a marine vessel wherein the bottom support member includes a first aperture and a second aperture.

An additional object of the present invention is to provide a marine vessel line management apparatus that is configured to operable couple bridle lines to an anchor line wherein the first aperture and the second aperture are configured to have a section of an anchor line journaled therethrough.

Yet a further object of the present invention is to provide a line management apparatus to be employed on a marine vessel wherein the present invention includes a first locking member and a second locking member.

Another object of the present invention is to provide a marine vessel line management apparatus that is configured to operable couple bridle lines to an anchor line wherein the first locking member is pivotally secured to the vertical support member along the first lateral edge of the bottom support member.

An alternate object of the present invention is to provide a line management apparatus to be employed on a marine vessel wherein the second locking member is pivotally secured to the vertical support member along the second lateral edge of the bottom support member.

Still a further object of the present invention is to provide a marine vessel line management apparatus that is configured to operable couple bridle lines to an anchor line wherein the first locking member includes a support arm and a rope engagement arm member.

A further object of the present invention is to provide a line management apparatus to be employed on a marine vessel wherein the second locking member includes a support arm and a rope engagement arm member.

An alternative objective of the present invention is to provide a marine vessel line management apparatus that is configured to operable couple bridle lines to an anchor line wherein the present invention further includes a rope guide member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is top view of a preferred embodiment of the present invention; and

FIG. 2 is a top view of the present invention; and

DETAILED DESCRIPTION

Figure 3:
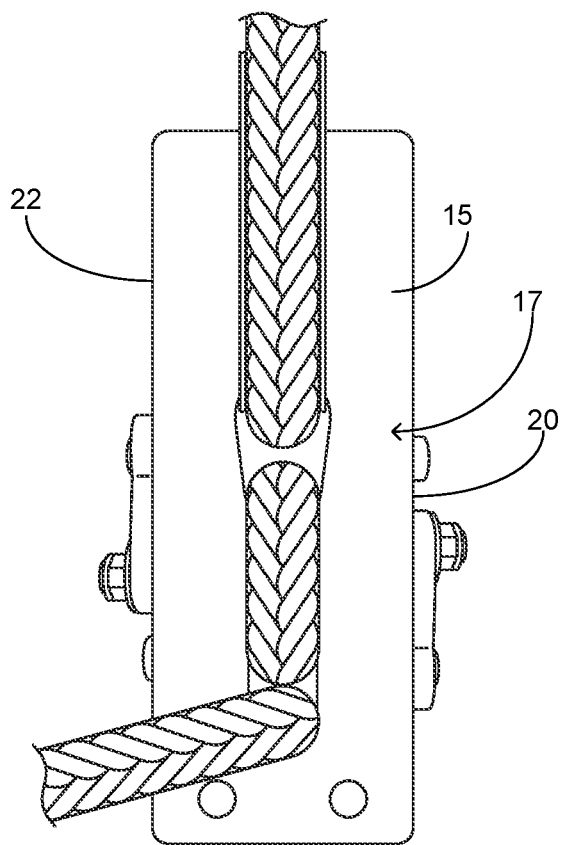
FIG. 3 is a bottom view of the present invention.
Figure 4:
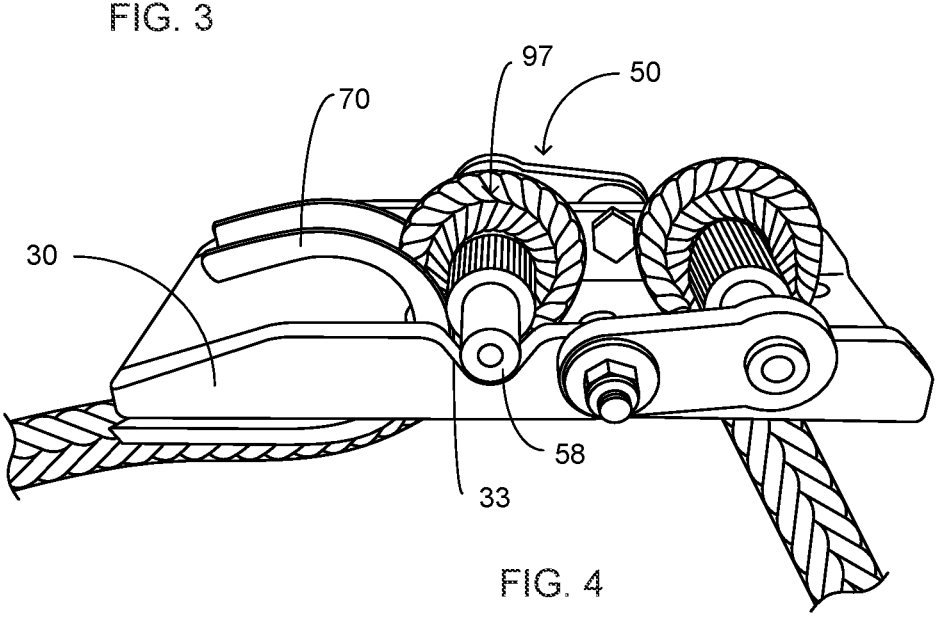
FIG. 4 is a side view of the present invention with line engaged with both locking members.

Referring now to the drawings submitted herewith, wherein various elements depicted therein are not necessarily drawn to scale and wherein through the views and figures like elements are referenced with identical reference numerals, there is illustrated a line management apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring to the Figures submitted as a part hereof, the line management apparatus 100 includes a body 10 wherein the body 10 is manufactured from a durable rigid material such as but not limited to stainless steel or aluminum. It is contemplated within the scope of the present invention that the body 10 and the elements thereof could be manufactured in alternate sizes in order to accommodate ropes having different diameters. The body 10 includes a first end 8 and a second end 9. Body 10 includes a bottom support member 15 wherein the bottom support member 15 is planar in manner and further includes an upper surface 16 and a lower surface 17. The bottom support member 15 includes a first longitudinal lateral edge 20 and a second longitudinal lateral edge 22. Journaled through the bottom support member 15 are a first aperture 25 and a second aperture 27. As is further discussed herein, the first aperture 25 and second aperture 27 are configured to have a portion of a line 99 placed therethrough.

The first aperture 25 and second aperture 27 are axially aligned and are placed approximately in the center of the bottom support member 15 intermediate first end 8 and second end 9. While the preferred embodiment of the first aperture 25 and second aperture 27 as illustrated herein are oval in shape, it is contemplated within the scope of the present invention that the first aperture 25 and second aperture 27 could be provided in alternate shapes. The bottom support member 15 includes fastener apertures 3,4 wherein the fastener apertures 3,4 are formed in the bottom support member 15 proximate the second end 9. Mechanically secured to the fastener apertures 3,4 are bridle fasteners 97,98. Bridle fasteners 97,98 are configured to have ends of a bridle line (not illustrated herein) secured thereto utilizing suitable techniques. It should be understood within the scope of the present invention that the bridle fasteners 97,98 could be various suitable hardware elements of alternate sizes so as to achieve the desired objective of securing a bridle line end thereto.

Integrally formed with the bottom support member 15 along the first longitudinal lateral edge 20 is first vertical support member 30. Similarly, a second vertical support member 35 is present along the second longitudinal lateral edge 20. The first vertical support member 30 extends upwards from the bottom support member 15 and is perpendicular thereto. The first vertical support member 30 extends intermediate the first end 8 and second end 9. Notches 31,33 are formed in the upper edge 32 of the first vertical support member 30 and is further discussed herein. The second vertical support member 35 extends upward from the bottom support member 15 and is perpendicular therewith. The second vertical support member 35 extends between the first end 8 and second end 9. Notches 36,38 are formed in the upper edge 37 of the second vertical support member 35 and is further discussed herein. It should be understood within the scope of the present invention that the first vertical support member 30 and the second vertical support member 35 could be provided in alternate heights. Both the first vertical support member 30 and the second vertical support member 35 function to have pivotally secured thereto the first locking member 50 and second locking member 60.

The first locking member 50 is pivotally secured to the second vertical support member 35 utilizing fastener 54. The first locking member 50 includes support arm member 51 wherein end 57 is pivotally secured to the second vertical support member 35 as discussed herein. Support arm member 51 sits adjacent to the outer surface of the second vertical support member 35 and is pivotally movable within a desired range in order to facilitate the functionality of the line management apparatus 100 as discussed herein. The support arm member 51 has secured thereto a rope engagement arm member 52 that is distal to end 57. The rope engagement arm member 52 is perpendicularly secured to the support arm member 51 and extends inwards into the line management apparatus 100. A gripping element 53 is disposed on the rope engagement arm member 52 wherein the gripping element 53 is configured to engage line 99 and assist in inhibiting the movement thereof ensuing the line being engaged with the line management apparatus 100.

It should be understood within the scope of the present invention that the gripping element 53 can be an integral component of the rope engagement arm member 52 that has been formed utilizing techniques such as but not limited to machining. Alternatively, the gripping element 53 could be an independent element that is secured to the rope engagement arm member 52 utilizing suitable techniques. The end 58 of the rope engagement arm member 52 will be positioned in notch 31 once the line 99 has been installed on the line management apparatus 100. End 59 of the rope engagement arm member 52 rests in notch 36 ensuing deployment of the line 99 in the line management apparatus 100.

Figure 5:
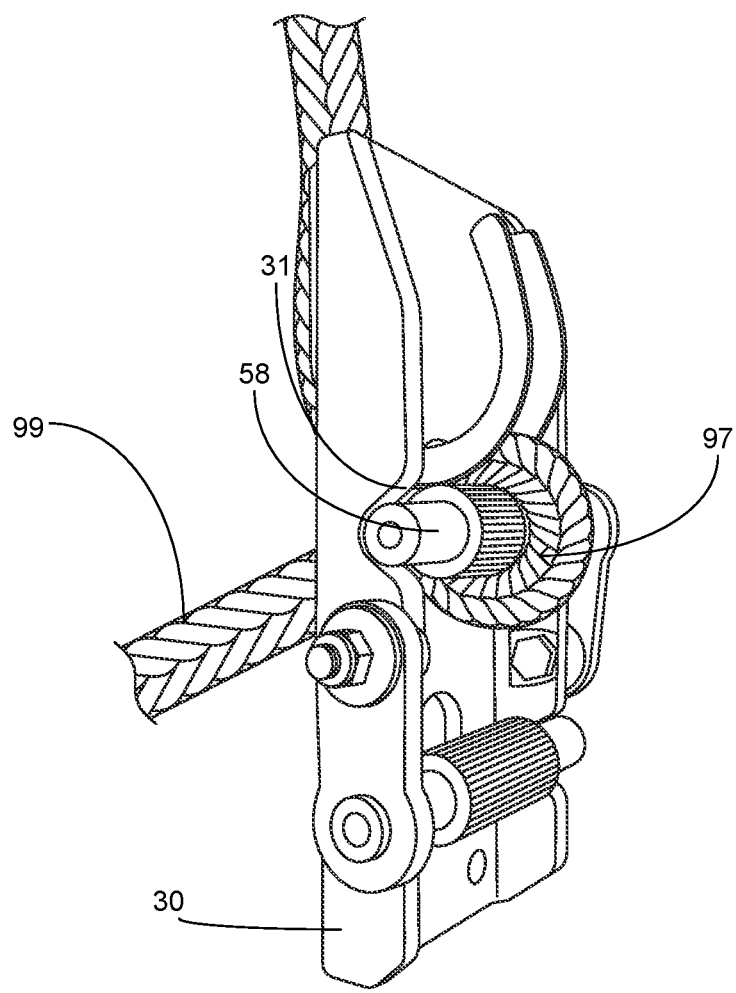
FIG. 5 is a side view of the present invention with line engaged with one locking member.

The line 99 is engaged with the first locking member 50 of the line management apparatus 100 via journaling a formed loop through the first aperture 25 wherein the loop is pushed through sufficiently so as to be moved laterally allowing a center of the loop to have journaled therethrough the rope engagement arm member 52. Subsequent journaling the rope engagement arm member 52 through the line loop 97, the line loop 97 is centered on the rope engagement arm member 52 as is illustrated herein in FIG. 5. In deployment, bridle line ends are secured to the bridle fasteners 97, 98 and the line 99 will become tight between the line management apparatus 100 and the object to which the line 99 is secured which in a preferred use of the line management apparatus 100 is an anchor. The line 99 portion between the line management apparatus 100 and a boat to which the bridle lines are secured will have little to no tension thereon as the bridle lines secured to the bridle fasteners 97,98 will bear the tension and as such distribute the force to two points on the bow of the boat, which as discussed herein can be a monohull or a catamaran. While a first locking member 50 and a second locking member 60 are illustrated and discussed herein, it should be understood within the scope of the present invention that the line management apparatus 100 could have only one locking member with a single aperture in the bottom support member 15.

The line management apparatus 100 includes the second locking member 60 which is identically constructed to the first locking member 50 as described herein above. The second locking member 60 is pivotally secured to the first vertical support member 30 and receives a portion of the line 99 that has been looped and journaled through the second aperture 27. The second locking member 60 includes the exact elements of the first locking member 50 and provides additional securing of the line 99 into the line management apparatus 100 for the purposes discussed herein.

The line management apparatus 100 further includes a radial guide member 70 wherein the radial guide member 70 is proximate the first locking member 50. The radial guide member 70 is arcuate in form having a u-shaped channel that is configured to engage a portion of the line 99. The radial guide member 70 is present in order to absorb load on the line 99 and further reduce the amount of stress points thereon. Furthermore, the radial guide member 70 provides a smoother and more gradual transition of the load on the line 99 during deployment of the line management apparatus 100. It is contemplated within the scope of the present invention that the radial guide member 70 could be formed in various alternate shapes and sizes in order to achieve the desired objective herein.

While the line management apparatus 100 utilizes a first vertical support member 30 and a second vertical support member 35 as structural support for pivotally mounting the first locking member 50 and the second locking member 60, it is contemplated within the scope of the present invention that the first locking member 50 and second locking member 60 could be pivotally coupled to the body 10 utilizing alternate elements and/or configurations.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A line management apparatus for a marine vessel that is configured to distribute a force load to two alternate load points wherein the line management apparatus comprises:

a body, said body having a bottom support member, said bottom support member having a first end and a second end, said bottom support member having an upper surface and a lower surface, said body having an aperture penetrating therethrough;

a locking member, said locking member having a support arm, said support arm being pivotally secured to said body, said locking member further including a rope engagement arm member, said rope engagement arm member being secured to said support arm distal to said body and perpendicular thereto; and a first fastener aperture and a second fastener aperture, said first fastener aperture and said second fastener aperture being journaled through said bottom support member proximate said second end thereof, said first fastener aperture and said second fastener aperture configured to have bridle fasteners secured thereto.

2. The line management apparatus that is configured to distribute a force load to two alternate load points as recited in claim 1, wherein said rope engagement arm member further includes a gripping element secured thereto wherein the gripping element inhibits movement of a portion of a line engaged therewith.

3. The line management apparatus that is configured to distribute a force load to two alternate load points as recited in claim 2, and further including a first bridle fastener and a second bridle fastener, said first bridle fastener operably coupled with said first fastener aperture, said second bridle fastener being secured to said second fastener aperture, said first bridle fastener and said second bridle fastener being secured to ends of a bridle.

4. The line management apparatus that is configured to distribute a force load to two alternate load points as recited in claim 3, wherein said aperture of said bottom support member is oval in shape or of a form allowing easy passage of the line therethrough.

5. A line management apparatus that is configured to distribute the load of an anchor line via operable coupling with a bridle secured to a marine vessel wherein the line management apparatus comprises:

a body, said body having a bottom support member, said bottom support member being planar in manner, said bottom support member having an upper surface and a lower surface, said bottom support member having a first end and a second end, said bottom support member having a first longitudinal lateral edge and a second longitudinal lateral edge;

a first vertical support member, said first vertical support member being contiguously formed with said body along said first longitudinal lateral edge, said first vertical support member being perpendicular with said bottom support member and extending upward away from said upper surface of said bottom support member, said first vertical support member having an upper edge;

a second vertical support member, said second vertical support member being contiguously formed with said body along said second longitudinal lateral edge, said second vertical support member being perpendicular with said bottom support member and extending upward away from said upper surface of said bottom support member, said second vertical support member having an upper edge;

a first locking member, said first locking member being pivotally secured to said second vertical support member, said first locking member having a support arm, said support arm being adjacent an outer surface of said second vertical support member, said support arm having a rope engagement arm member secured thereto distal to said body, said rope engagement arm member being perpendicular to said support arm, said rope engagement arm member extending inwards towards the body; and a first aperture, said first aperture being journaled through said bottom support member, said first aperture being proximate said first locking member, said first aperture configured to have a portion of an anchor line journaled therethrough.

6. The line management apparatus configured to distribute the load of an anchor line of the marine vessel as recited in claim 5, and further including a first fastener aperture and a second fastener aperture, said first fastener aperture and said second fastener aperture being proximate said second end of said bottom support member.

7. The line management apparatus configured to distribute the load of an anchor line of the marine vessel as recited in claim 6, and further including a first bridle fastener and a second bridle fastener, said first bridle fastener operably coupled with said first fastener aperture, said second bridle fastener being secured to said second fastener aperture, said first bridle fastener and said second bridle fastener being secured to ends of a bridle.

8. The line management apparatus configured to distribute the load of an anchor line of the marine vessel as recited in claim 7, wherein said rope engagement arm member further includes a gripping element formed thereon, said gripping element operable to inhibit movement of a portion of the anchor line engaged therewith.

9. The line management apparatus configured to distribute the load of an anchor line of the marine vessel as recited in claim 8, and further including a second locking member, said second locking member being pivotally secured to said first vertical support member, said second locking member having a support arm, said support arm of said second locking member being adjacent an outer surface of said first vertical support member, said support arm of said second locking member having a rope engagement arm member secured thereto distal to said body, said rope engagement arm member of said second locking member being perpendicular to said support arm of said second locking member, said rope engagement arm member of said second locking member extending inwards towards the body.

10. The line management apparatus configured to distribute the load of an anchor line of the marine vessel as recited in claim 9, and further including a second aperture, said second aperture being formed in said bottom support member, said second aperture being in axial alignment with said first aperture, said second aperture being proximate said second locking member.

11. The line management apparatus configured to distribute the load of an anchor line of the marine vessel as recited in claim 10, wherein said upper edge of said first vertical support member further includes a first notch and a second notch, said second notch of said first vertical support member configured to receive a portion of said rope engagement arm member of said second locking member.

12. The line management apparatus configured to distribute the load of an anchor line of the marine vessel as recited in claim 11, and further including a radial guide member, said radial guide member being secured to said bottom support member proximate said first aperture, said radial guide member operable to provide a transition of a load on the anchor line coupled to the line management apparatus.

13. The line management apparatus configured to distribute the load of an anchor line of the marine vessel as recited in claim 12, wherein said body is manufactured from aluminum, stainless steel or other suitable material.

14. The line management apparatus configured to distribute the load of an anchor line of the marine vessel as recited in claim 13, wherein said upper edge of said second vertical support member further includes a first notch and a second notch, said first notch configured to engage a portion of said rope engagement arm member of said first locking member.

* * * * *